(12) United States Patent
Park

(10) Patent No.: US 12,098,790 B2
(45) Date of Patent: Sep. 24, 2024

(54) PLUMBING CONNECTORS WITH NEGATIVE POISSON'S RATIO MATERIAL COATING

(71) Applicant: Joon Bu Park, Las Vegas, NV (US)

(72) Inventor: Joon Bu Park, Las Vegas, NV (US)

( * ) Notice: Subject to any disclaimer, the term of this patent is extended or adjusted under 35 U.S.C. 154(b) by 133 days.

(21) Appl. No.: 17/981,030

(22) Filed: Nov. 4, 2022

(65) Prior Publication Data
US 2024/0151335 A1    May 9, 2024

(51) Int. Cl.
*F16L 33/18*    (2006.01)
*F16L 33/28*    (2006.01)

(52) U.S. Cl.
CPC .............. *F16L 33/18* (2013.01); *F16L 33/28* (2013.01)

(58) Field of Classification Search
CPC ......... F16L 33/28; F16L 33/223; F16L 33/24; F16L 58/184
See application file for complete search history.

(56) References Cited

U.S. PATENT DOCUMENTS

| | | |
|---|---|---|
| 7,494,698 B2 | 2/2009 | Swager et al. |
| 7,686,352 B2 | 3/2010 | Preston |
| 8,363,303 B2 | 1/2013 | Horning et al. |
| 9,068,317 B2 | 6/2015 | Reinhall et al. |
| 9,080,301 B2 | 7/2015 | Reinhall et al. |
| 9,475,257 B2 | 10/2016 | Hu |
| 10,060,217 B2 | 8/2018 | Murphree et al. |
| 10,441,491 B2 | 10/2019 | Wyatt et al. |
| 10,688,007 B2 | 6/2020 | Wyatt et al. |
| 10,792,142 B2 | 10/2020 | Gorman |
| 10,850,406 B2 | 12/2020 | Lipton et al. |
| 10,918,561 B2 | 2/2021 | Wyatt et al. |
| 10,955,300 B2 | 3/2021 | Zeng et al. |
| 11,148,328 B2 | 10/2021 | Condon et al. |
| 11,213,702 B1 | 1/2022 | Scheiner |
| 2002/0150697 A1 | 10/2002 | Swager et al. |

(Continued)

FOREIGN PATENT DOCUMENTS

| | | |
|---|---|---|
| BR | 112017015592 | 3/2018 |
| CA | 2854007 | 5/2013 |

(Continued)

OTHER PUBLICATIONS

International Search Report and Written opinion in International Appln. No. PCT/US2023/36695, mailed on Apr. 2, 2023, 10 pages.

(Continued)

*Primary Examiner* — Zachary T Dragicevich
(74) *Attorney, Agent, or Firm* — Fish & Richardson P.C.

(57) ABSTRACT

An assembly includes an elongated, cylindrical pipe; a plumbing connector attached to an end of the pipe, in which an opening is defined through a length of the plumbing connector; and a negative Poisson's ratio (NPR) coating disposed on an interior surface of the plumbing connector that defines the opening, in which the NPR coating on the plumbing connector is configured to exhibit an auxetic behavior in response to application of a force to the NPR coating, in which the end of the pipe is disposed concentrically within the opening of the plumbing connector such that the NPR coating of the plumbing connector contacts an outer surface of the pipe, and in which a portion of the plumbing connector extends beyond the end of the pipe.

12 Claims, 11 Drawing Sheets

(56) References Cited

U.S. PATENT DOCUMENTS

| | | | |
|---|---|---|---|
| 2007/0272319 | A1 | 11/2007 | Bittenbender et al. |
| 2010/0059985 | A1* | 3/2010 | Nielson .................. F16L 33/24 |
| 2014/0147600 | A1* | 5/2014 | Neukirchen ............ F16L 58/08 |
| 2016/0200882 | A1 | 7/2016 | Bhat et al. |
| 2016/0201841 | A1* | 7/2016 | Heutchy ............... F16L 19/028 |
| 2018/0117219 | A1 | 5/2018 | Yang et al. |
| 2018/0149300 | A1* | 5/2018 | Weisenberg .......... F16L 55/164 |
| 2019/0343216 | A1 | 11/2019 | Huffa et al. |
| 2019/0344477 | A1 | 11/2019 | Huffa et al. |
| 2019/0360134 | A1 | 11/2019 | Huffa et al. |
| 2020/0016878 | A1 | 1/2020 | Ma et al. |
| 2020/0085128 | A1 | 3/2020 | Coyle et al. |
| 2020/0179574 | A1 | 6/2020 | Yang et al. |
| 2020/0197250 | A1 | 6/2020 | Wyatt et al. |
| 2020/0313577 | A1 | 10/2020 | Mici et al. |
| 2021/0121356 | A1 | 4/2021 | Wyatt et al. |
| 2021/0121679 | A1 | 4/2021 | Mohl et al. |
| 2021/0346576 | A1 | 11/2021 | Yang et al. |
| 2021/0346735 | A1 | 11/2021 | Coyle et al. |
| 2021/0378344 | A1 | 12/2021 | Abram |
| 2021/0404097 | A1 | 12/2021 | Mao et al. |
| 2022/0032511 | A1 | 2/2022 | Condon et al. |
| 2022/0072344 | A1 | 3/2022 | Scheiner |

FOREIGN PATENT DOCUMENTS

| | | |
|---|---|---|
| CA | 3017169 | 3/2020 |
| CN | 107245786 | 9/2019 |
| CN | 112185708 | 1/2021 |
| CN | 113980335 | 1/2022 |
| DK | 2776636 | 2/2017 |
| EP | 2776636 | 9/2014 |
| EP | 3337442 | 6/2018 |
| EP | 3567146 | 11/2019 |
| EP | 3567147 | 11/2019 |
| EP | 3575462 | 12/2019 |
| EP | 3625017 | 3/2020 |
| EP | 3698767 | 8/2020 |
| EP | 3806922 | 4/2021 |
| EP | 3425250 | 11/2021 |
| GB | 2435719 | 9/2007 |
| GB | 2489457 | 10/2012 |
| IN | 201717021357 | 12/2017 |
| JP | 2004506791 | 3/2004 |
| JP | 2021072942 | 5/2021 |
| JP | 6884780 | 6/2021 |
| KR | 19980074922 | 11/1998 |
| KR | 100201870 | 6/1999 |
| KR | 19990044423 | 6/1999 |
| KR | 20140080049 | 6/2014 |
| MX | 9801740 | 11/1998 |
| NO | 20171245 | 7/2017 |
| TR | 201618728 | 1/2017 |
| WO | WO 2013067438 | 5/2013 |
| WO | WO 2016133498 | 8/2016 |
| WO | WO 2016176444 | 11/2016 |
| WO | WO 2017027145 | 2/2017 |
| WO | WO 2018013188 | 1/2018 |
| WO | WO 2018213590 | 11/2018 |
| WO | WO 2019244031 | 12/2019 |
| WO | WO 2022040760 | 3/2022 |

OTHER PUBLICATIONS

Invitation to Pay Additional Fees in International Appln. No. PCT/US2023/36695, mailed on Dec. 21, 2023, 2 pages.

Wikipedia [online], "Garden hose," available on or before Feb. 17, 2022, via internet archive: Wayback Machine URL <https://web.archive.org/web/20220217000611/https://en.wikipedia.org/wiki/Garden_hose>, retrieved Mar. 7, 2023, URL <https://en.wikipedia.org/wiki/Garden_hose>, 5 pages.

Wikipedia [online], "Tetrafluoroethylene," available on or before Feb. 1, 2022, via internet archive: Wayback Machine URL <https://web.archive.org/web/20220201101026/https://en.wikipedia.org/wiki/Tetrafluoroethylene>, retrieved Mar. 7, 2023, URL <https://en.wikipedia.org/wiki/Tetrafluoroethylene>, 4 pages.

International Search Report and Written opinion in International Appln. No. PCT/US2023/36695, mailed on Apr. 15, 2024, 10 pages.

\* cited by examiner

FIG. 12

PLUMBING CONNECTORS WITH NEGATIVE POISSON'S RATIO MATERIAL COATING

BACKGROUND

Hoses, such as garden hoses or fire hoses, are used for transportation of liquids. Hose connectors are used to connect multiple hoses together to form a longer hose, or to connect accessories, such as spray heads or sprinklers, to the flexible tube of a hose.

SUMMARY

We describe here coatings for plumbing connectors, such as pipe fittings or hose connectors, where the coatings exhibit a negative Poisson's ratio (NPR), e.g., the coatings include NPR materials, such as polytetrafluoroethylene (PTFE)-based NPR materials, e.g., Teflon-based NPR materials. An NPR material has a Poisson's ratio less than zero, e.g., between −0.5 and 0; by contrast, a material having a Poisson's ratio greater than zero, e.g., between 0 and 0.5, is a positive Poisson's ratio (PPR) material. A plumbing connector coated with a coating that exhibits NPR behavior is referred to here as an NPR-coated plumbing connector. Generally, the NPR-coated plumbing connectors described here have a coating that exhibits an auxetic behavior when subject to deformation, such as a deformation caused by physical compression exerted on the plumbing connector by the hose or pipe to which the connector is connected. In some examples, the macroscopic behavior of the plumbing connector as a whole is auxetic and is a consequence of the inclusion of NPR materials in the coating of the plumbing connector and/or in the body of the plumbing connector.

In an aspect, an assembly includes an elongated, cylindrical pipe; a plumbing connector attached to an end of the pipe, in which an opening is defined through a length of the plumbing connector; and a negative Poisson's ratio (NPR) coating disposed on an interior surface of the plumbing connector that defines the opening, in which the NPR coating on the plumbing connector is configured to exhibit an auxetic behavior in response to application of a force to the NPR coating, in which the end of the pipe is disposed concentrically within the opening of the plumbing connector such that the NPR coating of the plumbing connector contacts an outer surface of the pipe, and in which a portion of the plumbing connector extends beyond the end of the pipe.

Embodiments can include one or any combination of two or more of the following features.

The interior surface of the plumbing connector includes threads for engaging corresponding threads on the end of the pipe.

The NPR coating of the plumbing connector includes an NPR polymer material, such as an NPR fluoropolymer, such as NPR polytetrafluoroethylene.

The NPR coating covers the entire interior surface of the plumbing connector.

The NPR coating is disposed on at least a portion of an exterior surface of the connector.

The NPR coating includes a layer of an NPR material and a layer of a material having a positive Poisson's ratio.

The NPR coating conformally coats the interior surface of the plumbing connector.

The NPR coating is a first NPR coating disposed on a first portion of the interior surface that overlaps with the pipe, and in which the plumbing connector includes a second NPR coating disposed on the portion of the plumbing connector that extends beyond the end of the pipe. In some cases, the second NPR coating is disposed on an interior surface of the portion of the plumbing connector that extends beyond the end of the pipe. In some cases, the second NPR coating is disposed on an exterior surface of the portion of the plumbing connector that extends beyond the end of the pipe.

A body of the plumbing connector includes a negative Poisson's ratio (NPR) material, such as one or more of an NPR metal foam, an NPR polymer foam, or an NPR ceramic foam.

The pipe includes a flexible hose.

The pipe includes a metal pipe, a polyvinylchloride (PVC) pipe, or a cross-linked polyethylene (PEX) pipe.

In an aspect, a method includes forming a mixture including negative Poisson's ratio (NPR) polymers dispersed or dissolved in a solvent; applying the mixture to an interior surface of a plumbing connector to form an NPR coating including the NPR material on the plumbing connector, wherein the interior surface of the plumbing connector defines an opening sized to receive a plumbing fixture; and bonding the NPR coating with the interior surface of the plumbing connector.

Embodiments can include one or any combination of two or more of the following features.

Applying the mixture to the interior surface of the plumbing connector includes applying the mixture by one or more of spray coating, dip coating, electrostatic powder coating, or additive manufacturing.

Bonding the NPR coating with the interior surface of the plumbing connector includes sintering the coating.

Bonding the NPR coating with the interior surface of the plumbing connector includes curing the coating using ultraviolet (UV) light.

NPR-coated plumbing connectors can provide one or more of the following advantages.

NPR coatings for plumbing connectors provides a high quality seal between the plumbing connector and the hose or pipe to which the plumbing connector is connected, thereby preventing leakage. The improved sealing is at least in part due to the auxetic behavior of the NPR coating in response to applied stress or deformation.

NPR coatings provide uniform, smooth coverage of one or more surfaces of the plumbing connector, e.g., without the need to apply tape to the complex surface geometry of the plumbing connector.

Plumbing connectors with NPR coatings can have better absorption of mechanical energy, lighter density, and increased resilience as compared to otherwise similar plumbing connectors made with PPR materials only. Moreover, NPR-coated plumbing connectors can sustain lateral forces without leakage, thereby offering a high quality seal to a plumbing fixture (e.g., pipe or hose) while remaining lightweight and sturdy.

While the above features are described with reference to specific aspects of this disclosure, any of the above features can be used with any of the above aspects. Other embodiments are within the scope of the claims.

DESCRIPTION OF DRAWINGS

FIG. 12 is a schematic of an example process for coating a plumbing connector.

DETAILED DESCRIPTION

We describe here coatings for plumbing connectors, such as pipe fittings or hose connectors, where the coatings exhibit a negative Poisson's ratio (NPR), e.g., the coatings include NPR materials, such as polytetrafluoroethylene (PTFE)-based NPR materials, e.g., Teflon-based NPR materials. An NPR material has a Poisson's ratio less than zero, e.g., between −0.5 and 0 (this is sometimes referred to as auxetic behavior); by contrast, a material having a Poisson's ratio greater than zero, e.g., between 0 and 0.5, is a positive Poisson's ratio (PPR) material. A plumbing connector coated with a coating that exhibits NPR behavior is referred to here as an NPR-coated plumbing connector. Generally, the NPR-coated plumbing connectors described here have a coating that exhibits an auxetic behavior when subject to deformation, such as a deformation caused by physical compression exerted on the plumbing connector by the hose or pipe to which the connector is connected.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a PPR material has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

Figure 1:
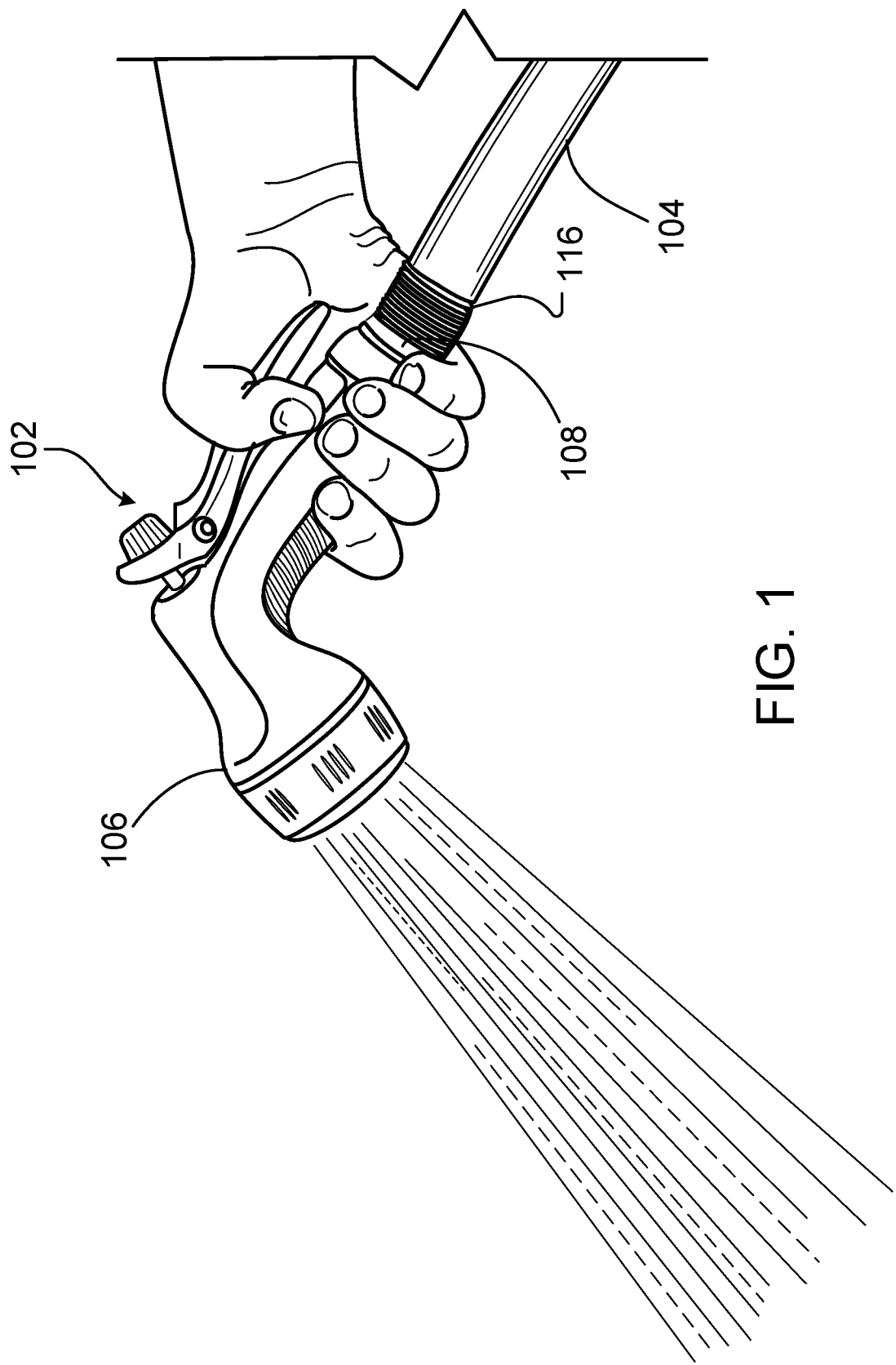
FIG. 1 is a diagram of a garden hose.

FIG. 1 is a diagram of a garden hose 102. Garden hoses are commonly used, e.g., to transport water for landscaping purposes, such as gardening or lawn care; for outdoor cleaning of items such as vehicles, equipment, building exteriors, or animals; or for providing drinkable water, e.g., by connecting a source of drinkable water to recreational vehicles or trailers.

The garden hose 102 includes a flexible tube 104 having a hollow interior through which water can flow. The flexible tube 104 is made from a resilient, flexible material, such as rubber, synthetic rubber, soft plastic, soft plastic reinforced with fibers, thermoplastic rubber, or another suitable material, such as a flexible, resilient photochemical derivative. Generally, the flexible tube 104 is made from a material with a positive Poisson's ratio (a "PPR material"). The material of the flexible tube gives the hose flexibility and a smooth exterior that facilitates pulling the hose past trees, posts, and other obstacles.

The garden hose 102 includes a sprayer pistol 106 attached to an end of the flexible tube 104. The sprayer pistol 106 is used to control the flow of water from the flexible tube 104, e.g., to concentrate water into a narrow stream or to spread the flow of water over a large area. The sprayer pistol 106 is attached to the flexible tube 104 of the garden hose 102 by a hose connector 108. The hose connector 108 is mechanically connected to (e.g., screwed onto) the end of the flexible tube 104, e.g., screwed onto a connector 116 at the end of the flexible tube 104. The sprayer pistol 106 is mechanically connected to (e.g., screwed onto) the hose connector 108. For instance, the connector 116 at the end of the flexible tube 104 can be a male threaded connector that is disposed in and screws onto the hose connector 108, and the sprayer pistol 106 can have a female threaded connector that receives and screws onto the hose connector 108.

The hose connector 108 (referred to here as an "NPR-coated hose connector") includes an NPR coating (see FIG. 2) that exhibits NPR behavior (also referred to as auxetic behavior), e.g., the NPR coating is formed of a material that is structured to exhibit NPR behavior. The NPR coating can be disposed on an interior surface (e.g., the surface that contacts the flexible tube 104), an exterior surface (e.g., the surface that contacts the sprayer pistol 106), or both of the hose connector 108. The NPR coating is an NPR polymer-based coating, e.g., an NPR fluoropolymer based coating, e.g., a polytetrafluoroethylene (PTFE)-based coating, such as a NPR Teflon® coating. For instance, the NPR coating is a polymer foam coating in which the cells of the foam are re-entrant cells, such that the NPR coating exhibits NPR behavior. An NPR fluoropolymer based coating, such as an NPR Teflon coating, is effective in preventing leaks at the junction between the flexible tube 104 and the sprayer pistol 106, e.g., due to its high flexural strength even at low temperature, high electrical resistance and dielectric strength, resistance to water (owing to fluorine's high electronegativity), and low coefficient of friction.

In some implementations, NPR-coated hose connectors can be used for connection between hoses and accessories other than sprayer pistols, such as sprinklers, misters, or other suitable attachments. In some implementations, the NPR-coated hose connector 108 can be used to connect multiple hoses end-to-end to create a longer hose. In some implementations, NPR-coated hose connectors can be used for connection between hoses and infrastructure, such as water supply infrastructure, e.g., fire hydrants, fire trucks, water tanks, or other suitable infrastructure.

In some implementations, an NPR coating is provided on a connection portion of a hose, a hose accessory, or both, e.g., in addition to or instead of on a hose connector. For instance, for a sprayer pistol that is threaded to be able to screw directly onto a hose, an NPR coating can be provided on the connection portion of the sprayer pistol and/or the connection portion of the hose.

NPR coatings, such as NPR fluoropolymer based coatings, can also be provided on other plumbing connectors, such as pipe fittings, e.g., elbows, T fittings, couplings, or other types of pipe fittings.

Figure 2:
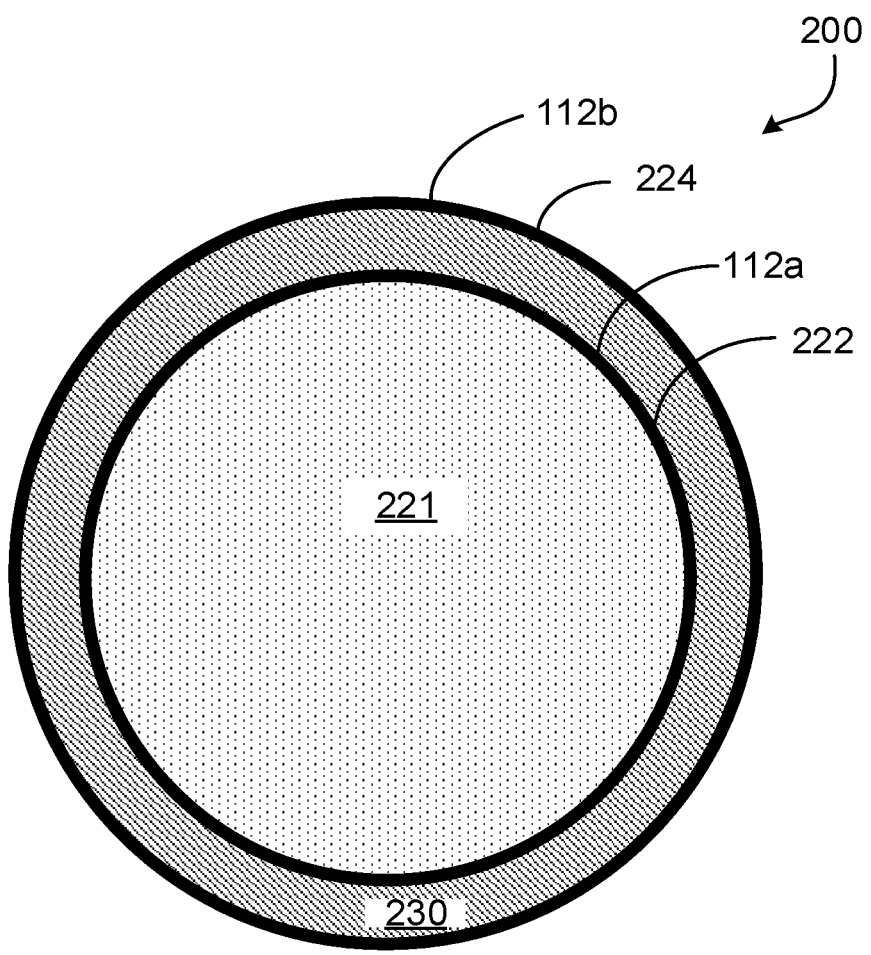
FIG. 2 is a cross-sectional view of an NPR-coated plumbing connector.

FIG. 2 is a cross-sectional view of an NPR-coated plumbing connector 200. The plumbing connector 200 has a generally circular cross section with an opening 221 through the length of the connector 200 and defined by an interior surface 222 of the connector. The opening has an inner diameter ($d_1$) sized to receive a pipe or hose (e.g., to screw onto the connector at the end of the flexible tube 104 of FIG. 1, or to screw onto or receive a metal or plastic pipe). For instance, the inner diameter can range between ⅜ inch and ¾ inch for a garden hose, between 1 and 6 inches for a fire hose, or other suitable ranges. In some examples, an outer diameter (do) is sized to attach to, e.g., screw into, an accessory such as the sprayer pistol 106 of FIG. 1. The outer diameter of the plumbing connector 200 can be constant along the length of the plumbing connector (e.g., the plumbing connector is cylindrical in shape) or can vary (e.g., the plumbing connector can be conical in shape, have a stepwise or bent profile, or vary otherwise). In some examples, threads (not illustrated) formed on an interior surface 222 and/or an exterior surface 224 of the plumbing connector 200 are sized to be screwed into or received threads on a pipe or tube. For instance, referring back to FIG. 1, the plumbing connector 200 can be a hose connector having interior threads sized to screw onto the connector 116 at an end of the flexible tube 104, and exterior threads sized to couple with threads on the sprayer pistol 106. In some examples, the plumbing connector 200 is a press fit connection that has a smooth interior surface 222, smooth exterior surface 224, or both.

In some examples, such as when the plumbing connector 200 is used to connect two pipes or hoses together, the two pipes or hoses are connected to opposite sides of the interior of the plumbing connector 200, e.g., as discussed below for FIG. 3. In these examples, threads formed on the interior surface 222 of the plumbing connector 200 are sized to connect with pipes or hoses. In some examples, a similar configuration can apply when the plumbing connector 200 is used to connect a pipe or hose to water supply infrastructure, e.g., to connect a hose to an exterior spout.

The plumbing connector 200 includes an NPR coating 112*a* disposed on the interior surface 222 of the plumbing connector 200. In the illustrated example, the plumbing connector 200 also includes an NPR coating 112*b* disposed on the exterior surface 224 of the plumbing connector 200. The NPR coatings 112*a*, 112*b* (collectively referred to as NPR coatings 112) are formed of material that is structured to exhibit NPR behavior (also referred to as auxetic behavior). For instance, the NPR coatings 112 are NPR polymer-based coating, e.g., NPR fluoropolymer based coatings, e.g., polytetrafluoroethylene (PTFE)-based coatings, such as NPR Teflon® coatings. The NPR coatings 112 can be polymer foam coatings in which the cells of the foam are re-entrant cells, such that the NPR coatings exhibit NPR behavior.

In some implementations, the NPR coating 112*a* or NPR coating 112*b* covers the entire interior surface 222 or exterior surface 224, respectively, of the plumbing connector 200. In some implementations, the NPR coating 112*a* or NPR coating 112*b* covers only a portion of the interior surface 222 or exterior surface 224, respectively, of the plumbing connector 200, e.g., covers an entire circumference of the plumbing connector 200 but only along a portion of the length of the plumbing connector 200. In some implementations, the plumbing connector 200 includes only a single NPR coating, such as only the NPR coating 112*a* or only the NPR coating 112*b*. When the surfaces 222, 224 include threads, the respective NPR coating 112*a*, 112*b* is disposed conformally over the threads such that the thread morphology is available even with the presence of the coating.

Referring again to FIG. 1, when the hose connector 108 is connected to the flexible tube 104 of the garden hose 102, an NPR coating is disposed at an interface between the interior surface of the hose connector 108 (e.g., corresponding to the interior surface 222 of the plumbing connector 200 of FIG. 2) and the connector 116 of the flexible tube 104 such that the NPR coating is in contact with the connector 116 of the flexible tube 104. Additionally, an NPR coating is disposed at an interface between the exterior surface of the hose connector 108 (e.g., corresponding to the exterior surface 224 of the plumbing connector 200 of FIG. 2) and a connector of the sprayer pistol 106 such that the NPR coating is in contact with the connector of the sprayer pistol 106.

Referring again specifically to FIG. 2, the thickness of the NPR coating 112*a* and the thickness of the NPR coating 112*b* can range between 500-1000 μm (e.g., between 510 and 1000 between 515 and 1000 between 520 and 1000 between 530 and 1000 between 550 and 1000 between 500 and 900 between 500 and 800 between 500 and 750 between 500 and 700 between 500 and 650 between 500 and 600 or any range within one of the foregoing ranges). In some implementations, the thickness of both NPR coatings 112*a*, 112*b* are the same; in some implementations, the NPR coatings 112*a* and 112*b* have different thicknesses. The thickness of each NPR coating 112*a*, 112*b* is substantially uniform, e.g., with a thickness variation across the coating of less than 50%, less than 40%, less than 30%, less than 25%, less than 20%, or less than 10%.

The NPR coatings 112*a*, 112*b* are polymer-based coatings, e.g., coatings exhibiting NPR behavior and including fluorinated polymers, e.g., fully or partially fluorinated polymers (e.g., perfluoropolymers) such as polytetrafluoroethylene (PTFE) (e.g., Teflon®). In some examples, the NPR coatings 112*a*, 112*b* include polymers such as PTFE homopolymers; polymers formed by polymerizing tetrafluoroethylene with other monomers; polymers of fluoroethylene also containing halogens other than fluorine; or mixtures of polymers of different composition, chain lengths, or molecular weight. In some examples, the NPR polymer coatings 112*a*, 112*b* include additives, such as pigments (e.g., mineral particles).

An NPR coating including fluorinated polymers, such as an NPR PTFE coating (e.g., an NPR Teflon® coating) can help prevent leaks at the joint between plumbing components (e.g., pipes, hoses, hose accessories such as sprayers, etc.). NPR coatings absorb mechanical energy and are resilient and low density. In addition, because of the hydrophobic nature of fluoropolymers such as PTFE, NPR coatings including fluorinated polymers repel water away from the interface. Moreover, because the NPR coating is a conformal coating (e.g., rather than as a tape), the surface coverage of the NPR coating on the connector can be even and smooth (e.g., without wrinkles that can occur with a tape), and is resilient against repeated use (e.g., repeating screwing of an accessory onto and off of a hose).

In some implementations, a body 230 of the plumbing connector 200 also includes an NPR material, e.g., exhibits NPR behavior. The NPR material of the body 230 of the plumbing connector 200 can be, e.g., an NPR metal, an NPR ceramic, or an NPR polymer, such as an NPR metal foam, an NPR ceramic foam, or an NPR polymer foam. NPR materials have a lower density than comparable PPR materials, e.g., than PPR materials of a similar composition or than PPR materials having similar mechanical properties, and plumbing connectors including NPR materials can thus be lighter in weight than similar plumbing connectors formed of PPR materials. Plumbing connectors that exhibit NPR behavior also can provide benefits including durability, water resistance, and hardness.

In some examples, the entirety of the NPR coating 112a, the NPR coating 112b, or both exhibits NPR behavior. In some examples, one or both of the NPR coatings 112a, 112b includes regions exhibiting NPR behavior and regions exhibiting positive Poisson's ratio (PPR) behavior. For instance, the coating can be a multi-layer coating including one or more NPR layers and one or more PPR layers. A material exhibiting PPR behavior contracts along a first direction when stretched along a second perpendicular direction. For example, one or both of the NPR coatings 112a and 112b can include both a polymer (e.g., a fluoropolymer such as PTFE) that is structured to exhibit PPR behavior and a polymer (e.g., a fluoropolymer such as PTFE, e.g., Teflon) that is structured to exhibit NPR behavior. The polymer of the PPR regions and the polymer of the NPR regions can be chemically the same (e.g., both regions can include PTFE polymers) or can be different polymers.

In some examples, one or both of the coatings 112a and 112b include a composite material including both an NPR material and a PPR material (referred to as an NPR-PPR composite). The NPR-PPR composite material can be a layered composite in which layers of NPR material alternate with layers of PPR material. The NPR-PPR composite material can be a matrix composite in which the NPR or the PPR material provides a matrix within which inclusions of the other material (the PPR or the NPR material, respectively) are disposed.

In some examples, one or both of the NPR coatings 112, 112b can include a combination of NPR materials and PPR materials such that the coating as a whole exhibits a zero Poisson's ratio behavior ("ZPR behavior"). A material that exhibits ZPR behavior has a Poisson's ratio that is close to zero, e.g., between −0.1 and 0.1. For instance, one or both of the NPR coatings 112a, 112b can include a combination of NPR materials and PPR materials having negative and positive Poisson's ratios, respectively, and arranged such that the overall coating exhibits ZPR behavior. For instance, the Poisson's ratio of the NPR and PPR materials in the NPR-PPR composite and the relative volume fractions and arrangement of the two types of material is selected such that the coating as a whole exhibits ZPR behavior.

By tailoring the material properties and physical arrangement of the NPR and PPR materials in the NPR coatings 112a or 112b of the plumbing connector 200 to achieve an overall ZPR behavior, the expansion and contraction of the coating 112a, 112b can be minimized. Minimization of expansion and contraction of the coatings can, e.g., help to reduce leakage that could otherwise occur responsive to application of a force to the coating.

In some examples, the coatings 112a and 112b are formed of a material that has been transformed from a material exhibiting PPR behavior (a "non-auxetic material") to a material exhibiting NPR behavior (an "auxetic material") (e.g., by a combination of heat and pressure as described with reference to FIG. 5 below). In a specific example, coatings 112a and 112b are formed of polytetrafluoroethylene that has been transformed from a non-auxetic polytetrafluoroethylene to an auxetic polytetrafluoroethylene, e.g., by application of heat, pressure, or both.

Figure 3:
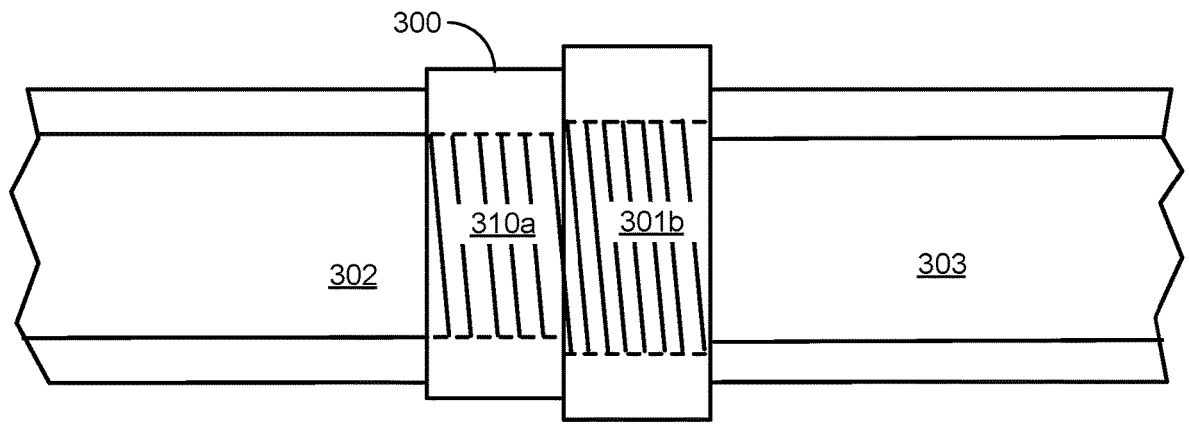
FIG. 3 is a side view of an NPR-coated plumbing connector.

FIG. 3 is a side view of an NPR-coated plumbing connector 300, e.g., a pipe fitting, joining two pipes 302, 303. The NPR-coated plumbing connector 300 has two adjacent sections 310a, 310b, with the section 310a sized to receive the pipe 302 and the section 310b sized to receive the pipe 303. In the example of FIG. 3, the pipe 302 has a smaller diameter than the pipe 303, so the inner diameter of the plumbing connector 300 in the section 310a is smaller than inner diameter of the plumbing connector 300 in the section 310b. In the example of FIG. 3, the outer diameter d1 of the section 310a is also smaller than the outer diameter d2 of the section 310b such that the plumbing connector 300 has a stepwise profile. In some examples, the outer diameter of the two sections 310a, 310b is the same even if the inner diameter differs between the two sections.

An NPR coating (not shown) is disposed on an interior surface of each section 310a, 310b of the plumbing connector 300. In some examples, a single NPR coating is applied uniformly across the entire interior surface of the plumbing connector 300, including the interior surface of each section 310a, 310b. In some examples, a different NPR coating (e.g., a coating of a different thickness, composition, or both) is applied to the interior surface of each section 310a, 310b.

The pipe 302 is inserted (e.g., screwed or mated via a press-fit connection) into the section 310a of the plumbing connector 300, and the pipe 304 is inserted into the section 310b of the plumbing connector 300. In some examples, to facilitate assembly, the section 310a and the section 310b can rotate relative to one another such that the pipes 302, 304 can be screwed easily into the respective sections 310a, 310b.

Figure 4:
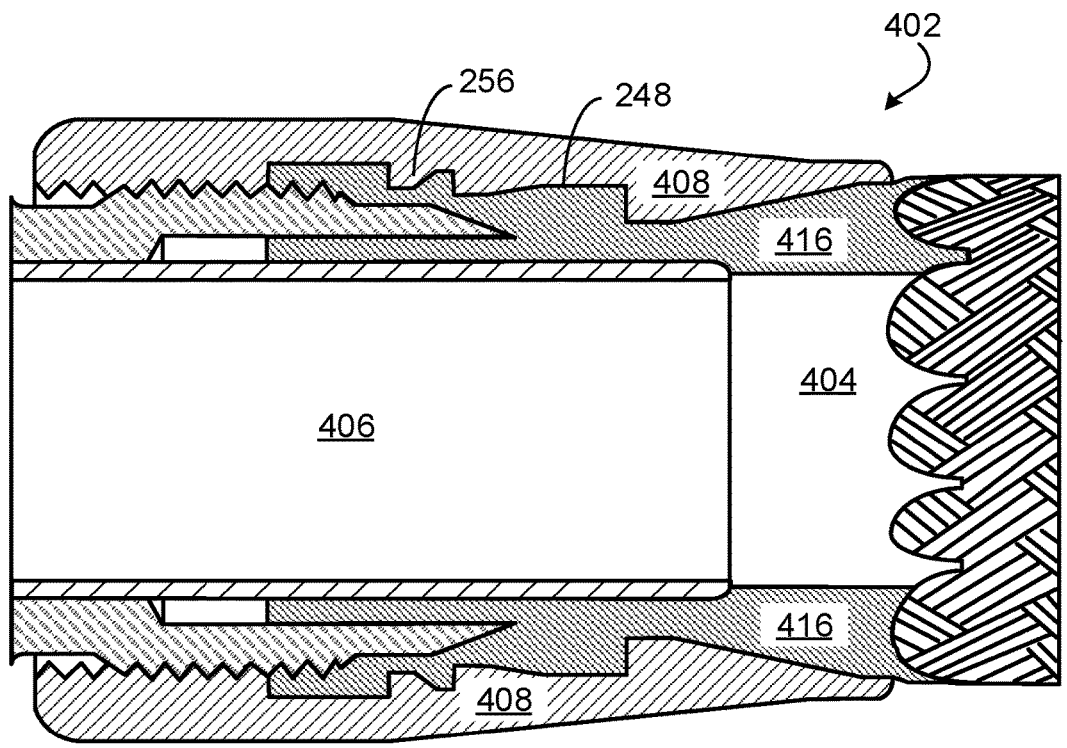
FIG. 4 is a cross-sectional view of a portion of a hose with an NPR-coated hose connector.

FIG. 4 is a cross-sectional view of a portion of a hose 402 including a flexible tube 404 connected to an accessory 406 by an NPR-coated hose connector 408. The NPR-coated hose connector 408 is coaxially disposed around a connector 416 disposed at an end of the flexible tube 404 and extends beyond an end of the connector 416. The inner surface of the hose connector 408 is shaped with kerf cuts 256 that are configured to mate with an outer surface 248 of the connector 416. The kerf cuts 256 enable the hose connector 408 to exert a compressive force onto the connector 416, thereby helping the hose connector 408 to stay in place and to generate a tight seal. In some examples, the inner surface of the hose connector 408 can include barbs, ribs, or other types of protrusions or indentations, sized and shaped to fit with the outer surface 248 of the connector 416, to provide engagement (e.g., mechanical engagement, frictional engagement, or both) between the hose connector 408 and the connector 416.

The NPR-coated hose connector 408 is secured in place relative to the connector 416, e.g., with adhesive, via a press-fit connection, or in another way, such that the hose connector 108 is not rotatable relative to the connector 416 or removable from the connector 416 without, e.g., application of excessive force or destruction of the connector 416 or hose connector 108. In some examples, the NPR-coated hose connector 408 is formed as an integral element with the connector 416.

Figure 5:
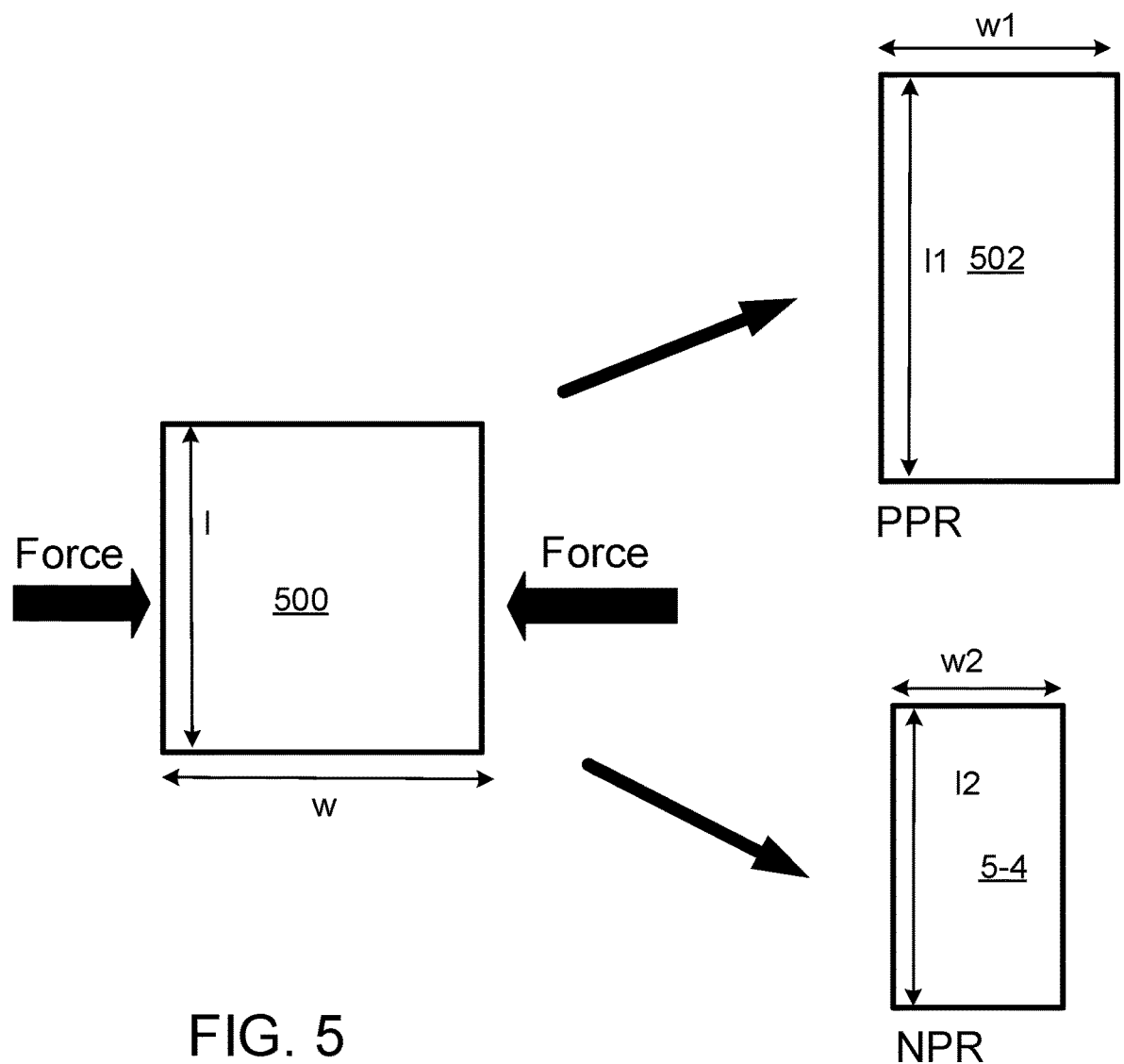
FIG. 5 is an illustration of materials with negative and positive Poisson's ratios.

Materials with negative and positive Poisson's ratios are illustrated in FIG. 5, which depicts a hypothetical two-dimensional block of material 500 with length 1 and width w. If the hypothetical block of material 500 is a PPR material, when the block of material 500 is compressed along its width w, the material deforms into the shape shown as block 502. The width w1 of block 502 is less than the width w of block 500, and the length l1 of block 502 is greater than the length 1 of block 500: the material compresses along its width and expands along its length. By contrast, if the hypothetical block of material 500 is an NPR material when the block of material 500 is compressed along its width w, the material deforms into the shape shown as block 504. Both the width w2 and the length l2 of block 504 are less than the width w and length 1, respectively, of block 500: the material compresses along both its width and its length.

NPR materials for coatings, plumbing connectors, or both can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An NPR foam can be polydisperse (e.g., the cells of the foam are not all of the same size) and disordered (e.g., the cells of the foam are randomly arranged, as opposed to being arranged in a regular lattice). An NPR foam can have a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 500 µm, about 1 mm, about 2 mm, or about 3 mm.

An example of an NPR foam structure is a re-entrant structure, which is a foam in which the walls of the cells are concave, e.g., protruding inwards toward the interior of the cells. In a re-entrant foam, compression applied to opposing walls of a cell will cause the four other, inwardly directed walls of the cell to buckle inward further, causing the material in cross-section to compress, such that a compression occurs in all directions. Similarly, tension applied to opposing walls of a cell will cause the four inwardly directed walls of the cell to unfold, causing the material in cross-section to expand, such that expansion occurs in all directions. NPR foams can have a Poisson's ratio of between −0.5 and 0, e.g., −0.5, −0.4, −0.3, −0.2, or −0.1. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that an item that includes an NPR material undergoes a different (e.g., smaller) change in dimension when absorbing energy than a comparable item formed of only PPR material.

Figure 6:
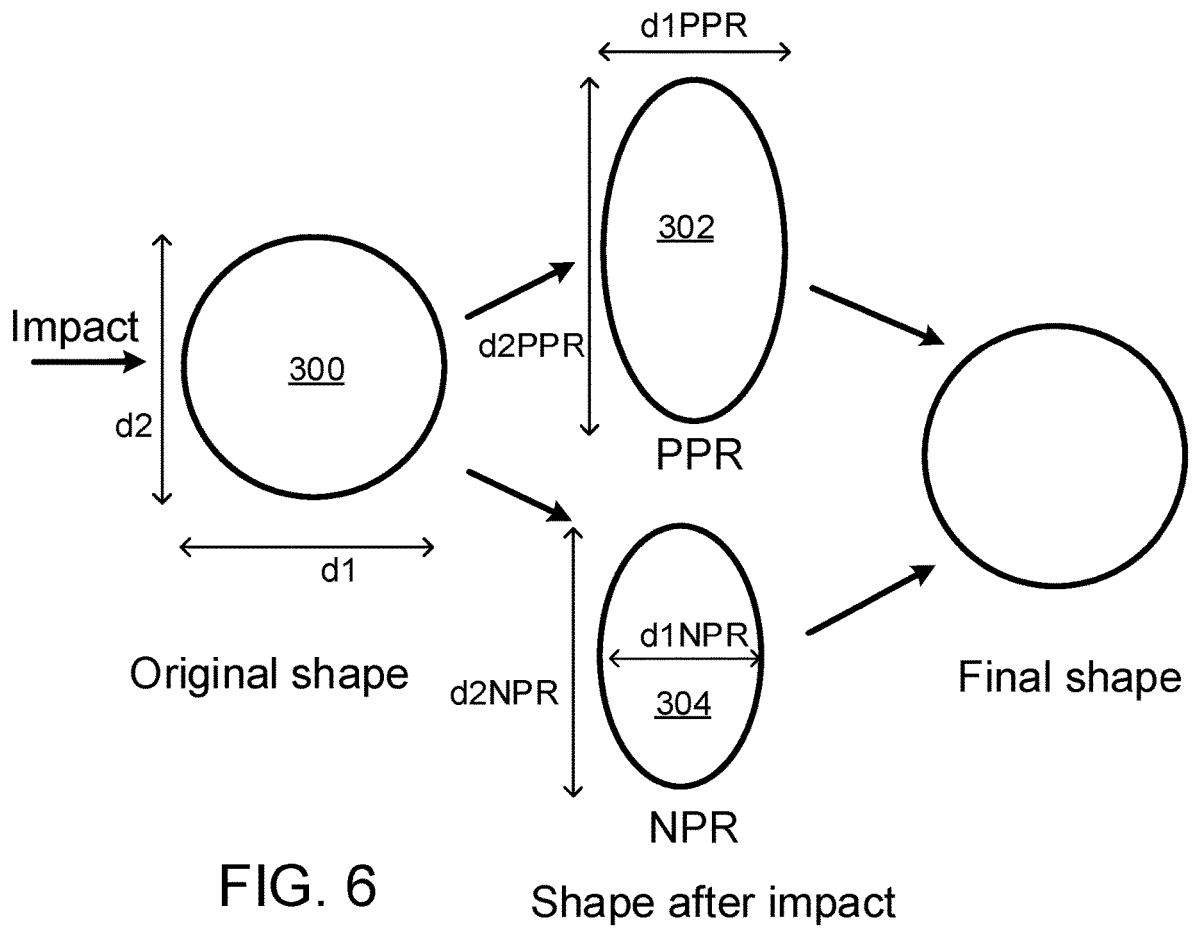
FIG. 6 is an illustration of balls with negative and positive Poisson's ratios.

FIG. 6 shows a schematic depiction of the change in diameter of a material 600 upon impact. Although the material 600 in FIG. 6 is shown as a rounded ball, a similar deformation occurs in materials of other shapes. Prior to impact, the material 600 has a diameter d1 in the direction of the impact and a diameter d2 in the direction perpendicular to the impact. If the material 600 is a PPR material, the material undergoes significant deformation (e.g., elastic deformation) into a shape 602, such that the diameter in the direction of the impact decreases to d1PPR and the diameter in the direction perpendicular to the impact increases to d2PPR. By contrast, if the material 600 is an NPR material, the material undergoes less extensive deformation into a shape 604. The diameter of the shape 604 in the direction of the impact decreases to d1NPR, which is approximately the same as d1PPR. However, the diameter of the shape 604 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball.

Figure 7A:
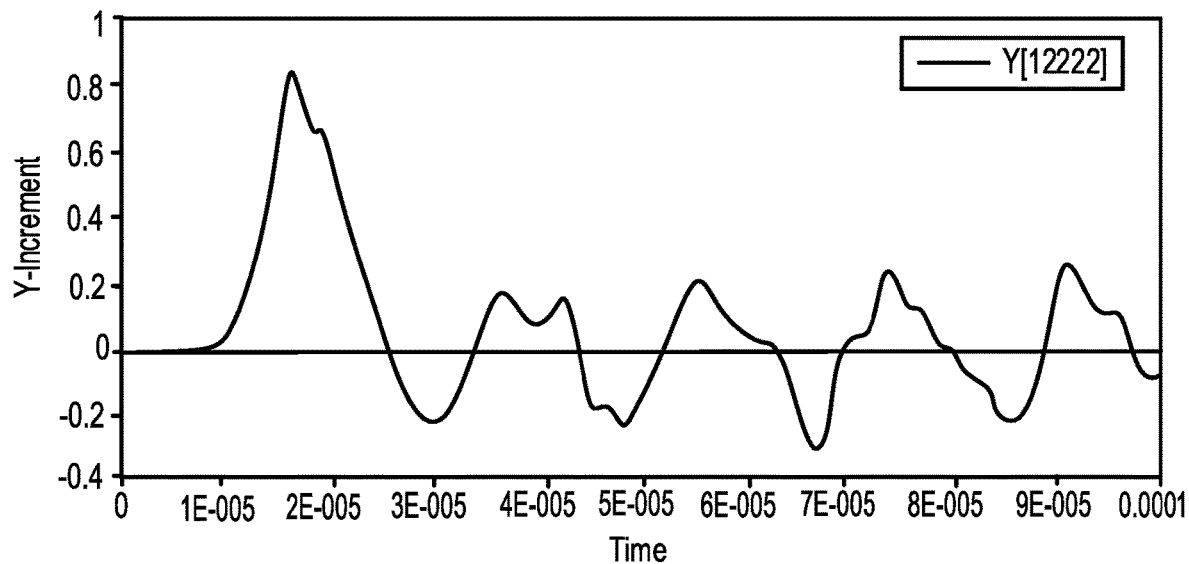
FIGS. 7A and 7B are plots of diameter versus time.
Figure 7B:
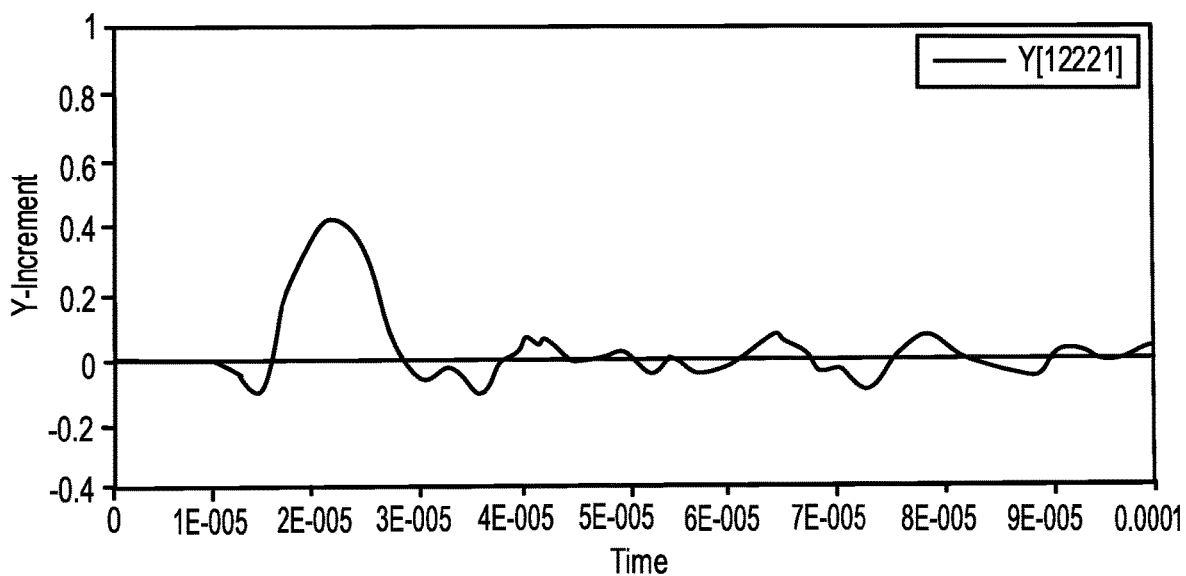

FIGS. 7A and 7B show plots of diameter versus time for a substantially spherical PPR material with a Poisson's ratio of 0.45 and an NPR material with a Poisson's ratio of –0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 7A and 7B are specific to substantially spherical materials, a similar behavior occurs in NPR and PPR materials of other shapes. The material of an insulator can be selected to balance rigidity and elasticity.

Figure 8:
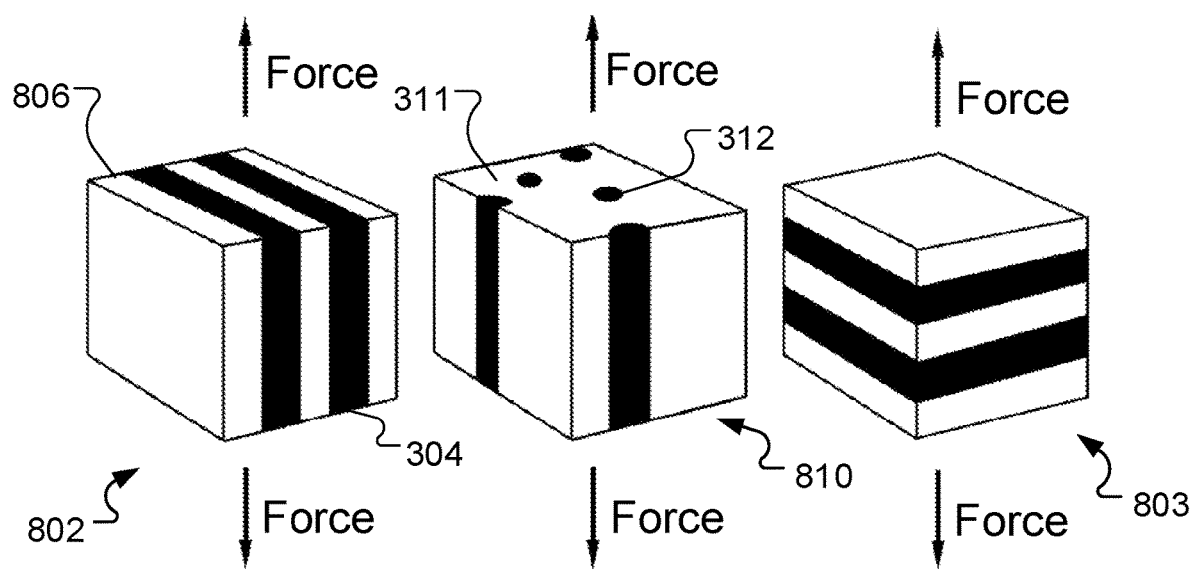
FIG. 8 is an illustration of composite materials.

FIG. 8 illustrates examples of NPR-PPR composite materials. An NPR-PPR composite material 802 is a laminar composite including alternating layers 804 of NPR material and layers 805 of PPR material. The layers 804, 806 are arranged in parallel to a force to be exerted on the composite material 802. Although the layers 804, 806 are shown as having equal width, in some examples, a laminar composite can have layers of different widths.

An NPR-PPR composite material 808 is a laminar composite including alternating layers of NPR material and PPR material, with the layers arranged perpendicular to a force to be exerted on the material 808. In some examples, the layers of a laminar composite are arranged at an angle to the expected force that is neither perpendicular nor parallel.

An NPR-PPR composite material 812 is a matrix composite including a matrix phase 811 of NPR material with a reinforcement phase 812 of PPR material. In the material 812, the reinforcement phase 812 includes fibers of the PPR material; in some examples, the reinforcement phase 812 can include particles or other configuration. In some examples, NPR-PPR composite materials can have a matrix phase of a PPR material with a reinforcement phase of an NPR material.

Figure 9:
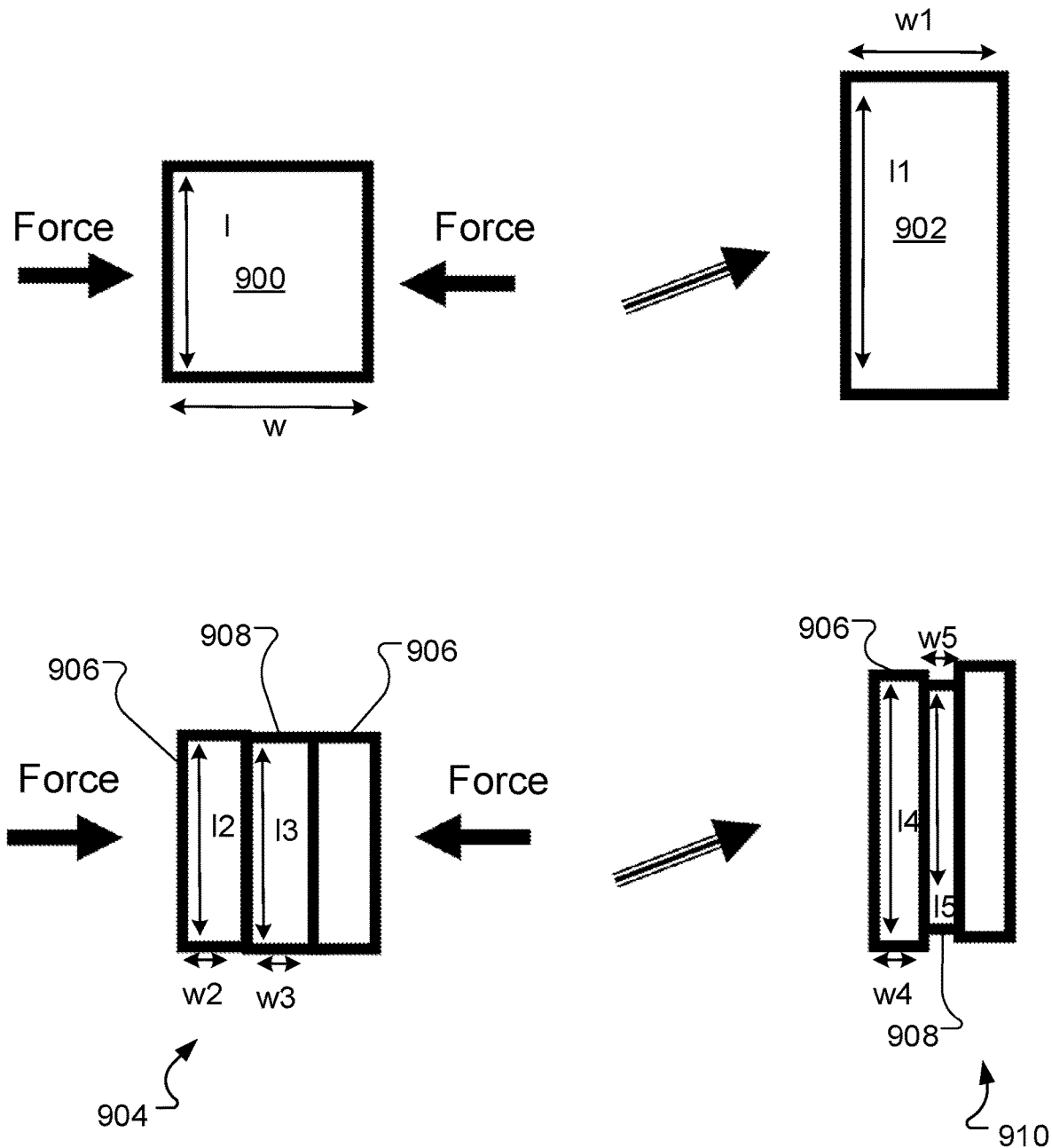
FIG. 9 is an illustration of a material with a positive Poisson's ratio and a composite material.

FIG. 9 illustrates the mechanical behavior of PPR and NPR/PPR composite materials. A hypothetical block 900 of PPR material, when compressed along its width w, deforms into a shape 902. The width w1 of the compressed block 902 is less than the width w of the uncompressed block 900, and the length l1 of the compressed block 902 is greater than the length l of the uncompressed block: the material compresses along the axis to which the compressive force is applied and expands along a perpendicular axis.

A block 904 of NPR/PPR composite material includes a region 908 of NPR material sandwiched between two regions 906 of PPR material. When the block 904 of composite material is compressed along its width, the material deforms into a shape 910. The PPR regions 906 compress along the axis of compression and expand along a perpendicular axis, e.g., as described above for the block 900 of PPR material, such that, e.g., the width w2 of a region 906 of uncompressed PPR material compresses to a smaller width w4 and the length l2 of the region 906 expands to a greater length l4. In contrast, the NPR region 908 compresses along both the axis of compression and along the perpendicular axis, such that, e.g., both the width w3 and length l3 of the uncompressed NPR region 908 are greater than the width w5 and length l5 of the compressed NPR region 908.

Figure 10:
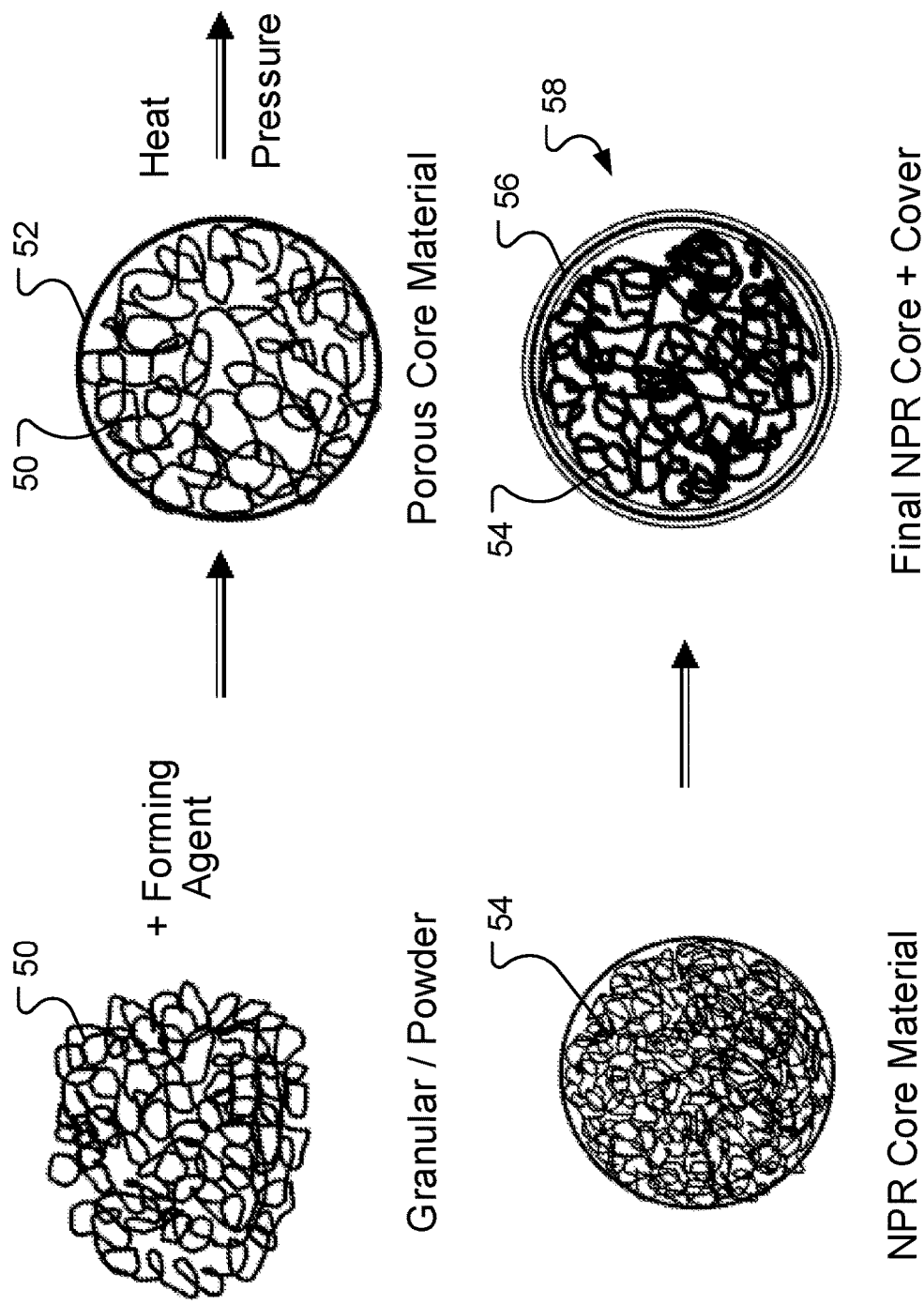
FIG. 10 is an illustration of a method of making an NPR material.
Figure 11:
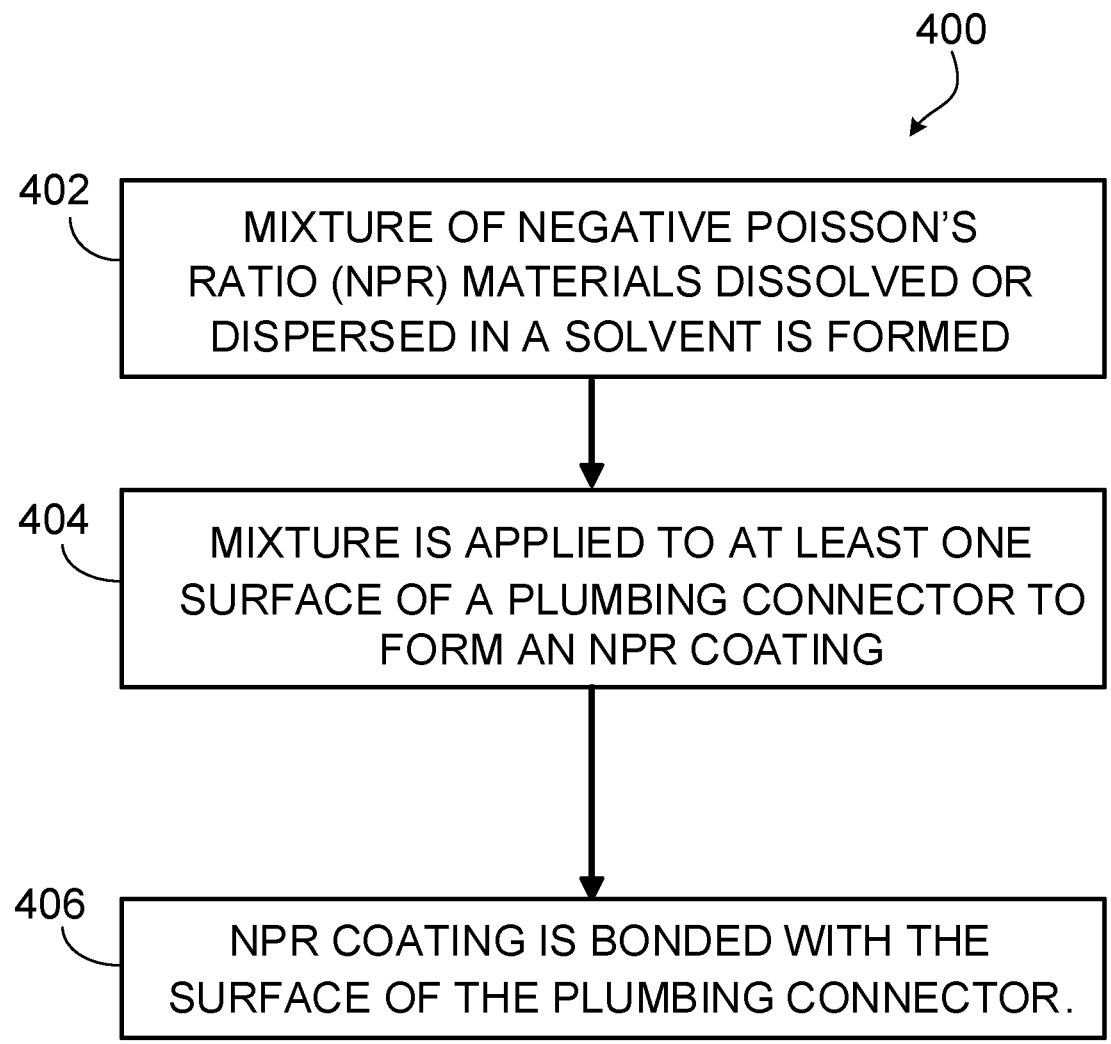
FIG. 11 is a flowchart showing a method for coating a plumbing connector.

FIG. 10 illustrates an example method of making an object, such as NPR plumbing connector, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

In some examples, a material can be formed into an NPR material by forming nanoscale or microscale structures, such as spheres or tubules, with the material.

Other methods can also be used to fabricate an object formed of an NPR material or an NPR-PPR composite material. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, an inner layer may be 3D printed while the out layer is not, or vice versa. Additive manufacturing techniques can enable seams to be eliminated.

FIG. 6 is a flowchart showing a method 400 for coating a plumbing connector with an NPR coating. A mixture of NPR materials dissolved or dispersed in a solvent is formed (402). For example, forming the mixture includes adding a desired quantity of the NPR material to the solvent and stirring or agitating to dissolve. In some examples, an oxidant, a dopant, or both are also added to the mixture, e.g., to facilitate dissolving or dispersing of the NPR material in the solvent, to facilitate application of the NPR material to the plumbing connector, or to provide the resulting coating with desired properties.

The mixture is applied to at least one surface of the plumbing connector to thereby form an NPR coating on the plumbing connector (404). The application of the mixture to form the NPR coating on the plumbing connector can be done by processes such as spraying, dip coating, electrostatic powder coating, additive manufacturing (e.g., printing the coating using a 3D printer), or other suitable approaches.

In some implementations, multiple layers of the coating are formed, e.g., with different orientations of foam cells of the material, to achieve desired properties. In some implementations, the coating is formed as an NPR-PPR composite with alternating layers of NPR material (formed from the NPR-solvent mixture) and PPR material (formed from a mixture of a PPR material and a solvent). In some implementations, to achieve a desired thickness or thickness uniformity, the plumbing connector is coated multiple times with the same mixture.

The NPR coating is bonded to the surface of the plumbing connector (406). In some implementations, the bonding includes sintering the NPR coating, e.g., at a temperature of between 0° C. and 60° C. for a duration between 1 h and 24 h. In some implementations, the bonding includes curing the NPR coating using an ultraviolet (UV) light for a duration between 1 h and 24 h. In some implementations, the bonding step is omitted, e.g., depending on the process used to apply the coating onto the plumbing connector, the affinity between the surface of the plumbing connector and the chemistry of the coating, or other factors.

Figure 12:
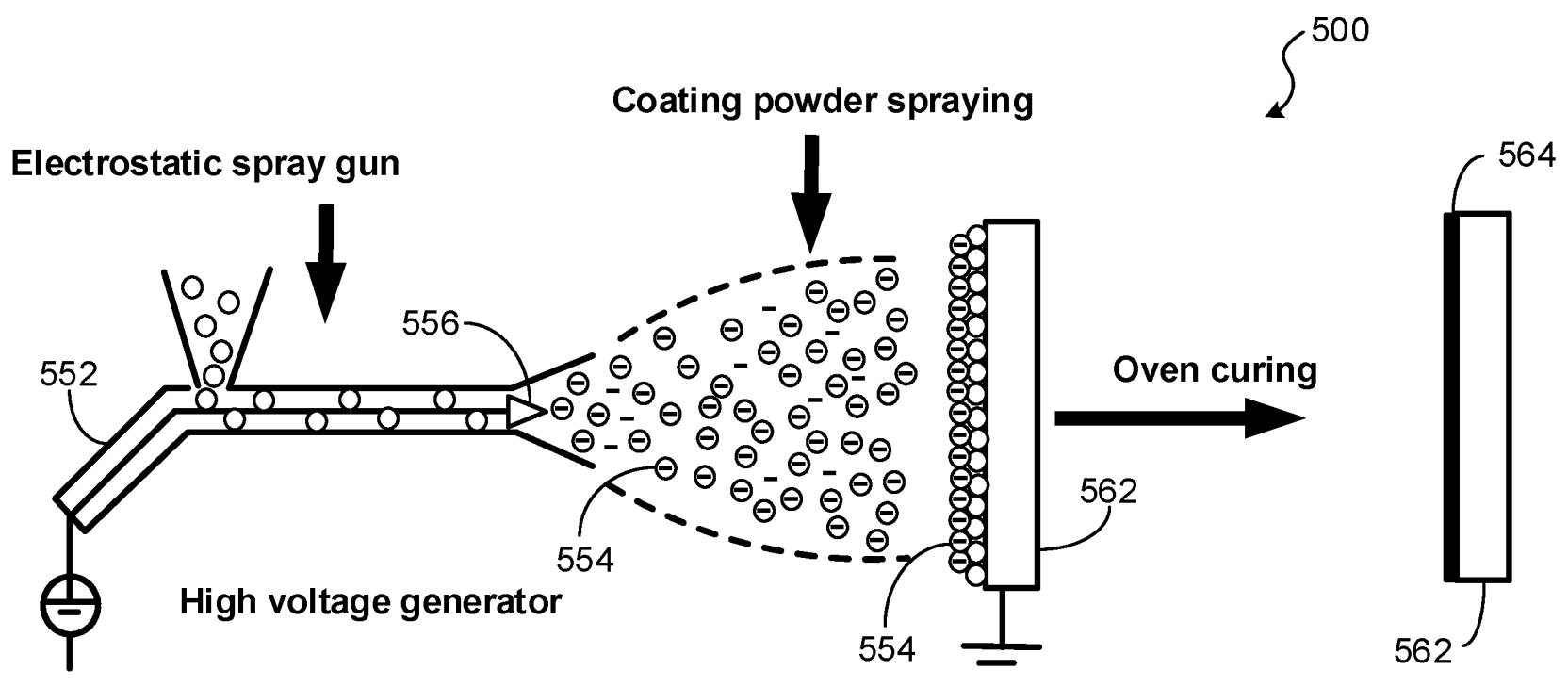

FIG. 12 is a schematic diagram of an example process 550 for coating a plumbing connector 562 with an NPR coating 564, such as an NPR PTFE (e.g., Teflon coating). The example process 550 enables bonding between the NPR coating 564 and the surface of the plumbing connector 562 as a result of mechanical keying between NPR-PTFE particles and the surface of the plumbing connector 562. In some implementations, the NPR-PTFE particles 554 are between 10 and 100 microns in diameter, e.g., between 10 and 50 microns in diameter.

In the example process 550, an electrostatic spray gun 552 ejects NPR-PTFE particles 554 toward the surface of the plumbing connector 562. In electrostatic coating, a fluid of NPR-PTFE particles is atomized and negatively charged, and ejected toward the surface of the plumbing connector 562, which is electrically neutral or positively charged. The NPR-PTFE particles 554 receive charge from an electrically charged electrode at a tip 556 of the electrostatic spray gun 552 and receive their initial momentum from fluid pressure and air pressure upon ejection from the electrostatic spray gun 552. The NPR-PTFE particles 554 are attracted to the surface of the plumbing connector 562 and held there by the charge differential between the particles 554 and the surface of the plumbing connector 562. Once deposition of the particles 554 is complete, the plumbing connector 562 with the NPR-PTFE particles 554 disposed thereon are cured, e.g., sintered, thereby producing a substantially uniform NPR coating 564 on the plumbing connector.

Electrostatic spraying offers high transfer efficiency (e.g., 65% to 95%) and good edge coverage. The attraction between NPR-PTFE particles 554 and the surface of the plumbing connector 562 is strong enough to cause at least some of the NPR-PTFE particles 554 that miss the surface of the plumbing connector 562 to curve back, which contributes to the high transfer efficiencies. In some implementations, an average numerical density of NPR-PTFE particles 554 that are coated onto the surface of the plumbing connector 562 during an electrostatic spraying process is between 1.0 $\mu m^{-1}$ and 25 $\mu m^{-1}$ (e.g., between 2.0 $\mu m^{-1}$ and 25 $\mu m^{-1}$, between 2.0 $\mu m^{-1}$ and 20 $\mu m^{-1}$, between 3.0 $\mu m^{-1}$ and 20 $\mu m^{-1}$, between 3.0 $\mu m^{-1}$ and 15 $\mu m^{-1}$, between 4.0 $\mu m^{-1}$ and 15 $\mu m^{-1}$, between 5.0 $\mu m^{-1}$ and 15 $\mu m^{-1}$, between 5.0 $\mu m^{-1}$ and 10 $\mu m^{-1}$, or any range within one of the foregoing ranges).

In some implementations, the NPR-PTFE particles are applied to the surface of the plumbing connector using air atomized spraying to form an NPR coating. In this example, the NPR-PTFE particles are supplied to a spray gun by siphon, gravity, or pressure feed. When the gun trigger is pulled, the NPR-PTFE particles flow through the nozzle as a fluid stream. Compressed air from the center of the nozzle surrounds the fluid with a hollow cone as it leaves the nozzle, forming small droplets containing NPR-PTFE particles. Additional jets of compressed air from the nozzle break up the droplets and form an elliptical pattern. The air atomized spraying process allows control of spay patterns and degree of atomization and can produce coatings with fine finishes.

In electrostatic spray coating or air atomized spraying, the NPR-PTFE particles may be delivered to the spray gun in a dry state or in form of a liquid dispersion. A suitable solvent (e.g., trichlorotrifluoroethane or low-boiling halogenated hydrocarbons) can prevent the drying of the NPR-PTFE particles.

When the plumbing connector itself is an NPR plumbing connector, the NPR plumbing connector can be formed by manufacturing methods such as injection molding, casting, extrusion, micro-machining, co-forming, re-flow, electron beam melting, and various additive manufacturing (e.g., 3D printing) techniques, such as stereolithography, selective laser sintering, or other appropriate additive manufacturing technique.

NPR materials for plumbing connectors or plumbing connector coatings can be foams, such as polymeric foams, ceramic foams, metal foams, or combinations thereof. A foam is a multi-phase composite material in which one phase is gaseous and one or more other phases are solid (e.g., polymeric, ceramic, or metal). Foams can be closed-cell foams, in which each gaseous cell is sealed by solid material; open-cell foams, in which each cell communicates with the outside atmosphere; or mixed, in which some cells are closed and some cells are open.

An NPR foam can be polydisperse (e.g., the cells of the foam are not all of the same sizes) and disordered (e.g., the cells of the foam are randomly arranged, as opposed to being arranged in a regular lattice). An NPR foam can be a cellular structure having a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 500 µm, about 1 mm, about 2 mm, or about 3 mm. The cells of an NPR foam can be re-entrant cells.

In some examples, NPR foams are produced by the transformation of PPR foams to change the structure of the foam into a structure that exhibits a negative Poisson's ratio. In some examples, NPR foams are produced by the transformation of nanostructured or micro-structured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by the transformation of PPR foams to change the structure of the foam into a structure that exhibits a negative Poisson's ratio. In some examples, NPR foams are produced by the transformation of nanostructured or micro-structured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layers of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber-reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

NPR materials can exhibit various desirable properties, including high shear modulus, effective energy absorption, and high toughness (e.g., high resistance to indentation, high fracture toughness), among others. The properties of NPR materials are such that a plumbing connector that includes an NPR material (an "NPR coated-plumbing connector") undergoes a different (e.g., smaller) change in dimension when absorbing energy than a comparable plumbing connector formed of only PPR material (a "PPR plumbing connector").

For plumbing connectors for use with flexible pipes or tubes (e.g., hoses, plastic pipes such as polyvinylchloride (PVC) or cross-linked polyethylene (PEX) pipes), the compressibility of the plumbing connector affects the elastic deformation (e.g., compression) experienced by the pipe or tube when it absorbs energy from impacts. A suitable amount of deformation enables the plumbing connector to expand and compress to maintain its structural integrity. A highly deformable plumbing connector will have a large amount of deformation when absorbing impact and may be inefficient in supporting compressive loads (e.g., supporting the weight of a pipe or tube). To design a plumbing connector that is capable of efficiently absorbing impact, the material of the plumbing connector can be selected to balance rigidity and elasticity. NPR materials can be incorporated into the plumbing connector to provide the plumbing connector with a desired deformability (e.g., rigidity) and strength.

In some examples, a material can be formed into an NPR material by forming nanoscale or microscale structures, such as spheres or tubules, with the material.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain the present disclosure. Other changes, substitutions, and alterations are also possible without departing from the spirit and scope of the present disclosure.

A number of embodiments of these systems and methods have been described. Nevertheless, it will be understood that various modifications can be made without departing from the spirit and scope of this disclosure. Accordingly, other embodiments are within the scope of the following claims.

What is claimed is:

1. An assembly comprising:
    an elongated, cylindrical pipe;
    a plumbing connector attached to an end of the pipe, in which an opening is defined through a length of the plumbing connector; and
    a negative Poisson's ratio (NPR) coating disposed on an interior surface of the plumbing connector that defines the opening, in which the NPR coating on the plumbing connector is configured to exhibit an auxetic behavior in response to application of a force to the NPR coating, in which the NPR coating comprises a layer of an NPR material and a layer of a material having a positive Poisson's ratio,
    in which the end of the pipe is disposed concentrically within the opening of the plumbing connector such that the NPR coating of the plumbing connector contacts an outer surface of the pipe, and in which a portion of the plumbing connector extends beyond the end of the pipe.

2. The assembly of claim 1, in which the interior surface of the plumbing connector comprises threads for engaging corresponding threads on the end of the pipe.

3. The assembly of claim 1, in which the NPR coating of the plumbing connector comprises an NPR polymer material.

4. The assembly of claim 1, in which the NPR coating of the plumbing connector comprises an NPR fluoropolymer.

5. The assembly of claim 4, in which the NPR coating of the plumbing connector comprises NPR polytetrafluoroethylene.

6. The assembly of claim 1, in which the NPR coating covers the entire interior surface of the plumbing connector.

7. The assembly of claim 1, in which the NPR coating is disposed on at least a portion of an exterior surface of the connector.

8. The assembly of claim 1, in which the NPR coating conformally coats the interior surface of the plumbing connector.

9. The assembly of claim 1, in which a body of the plumbing connector comprises a negative Poisson's ratio (NPR) material.

10. The assembly of claim 9, in which the body of the plumbing connector comprises one or more of an NPR metal foam, an NPR polymer foam, or an NPR ceramic foam.

11. The assembly of claim 1, in which the pipe comprises a flexible hose.

12. The assembly of claim 1, in which the pipe comprises a metal pipe, a polyvinylchloride (PVC) pipe, or a cross-linked polyethylene (PEX) pipe.

* * * * *